(12) United States Patent
Gordon

(10) Patent No.: US 8,925,778 B1
(45) Date of Patent: Jan. 6, 2015

(54) ADD-ON STORING AND ORGANIZING COMPARTMENT FOR MOTORCYCLE HARD SADDLEBAGS

(76) Inventor: David M. Gordon, Temecula, CA (US)

( * ) Notice: Subject to any disclaimer, the term of this patent is extended or adjusted under 35 U.S.C. 154(b) by 0 days.

(21) Appl. No.: 12/929,787

(22) Filed: Feb. 16, 2011

Related U.S. Application Data

(60) Provisional application No. 61/305,308, filed on Feb. 17, 2010.

(51) Int. Cl.
*B62J 9/00* (2006.01)
(52) U.S. Cl.
CPC .......................................... *B62J 9/00* (2013.01)
USPC .......................................................... 224/413
(58) Field of Classification Search
USPC .......................................................... 224/413
See application file for complete search history.

(56) References Cited

U.S. PATENT DOCUMENTS 5,114,060 A * 5/1992 Boyer ............................ 224/413

* cited by examiner

*Primary Examiner* — Justin Larson

(57) ABSTRACT

In one embodiment, an add-on storing or organizing embodiment comprises a compartment that comprises a lower surface, one or more walls coupled to a perimeter of the lower surface, and a cavity defined at least in part by the lower surface and the one or more walls. The compartment further comprises an upper surface formed substantially opposite the lower surface of the compartment. The compartment is configured to fit into a hard motorcycle saddlebag. One or more storing and/or organizing components are further contained in the compartment's formed cavity comprising of at least one or more pre-arranged spaces for holding articles. The upper surface may be substantially open to facilitate placing and/or removing of articles. Other embodiments and related storing and organizing methods and manufacturing methods are also disclosed herein.

3 Claims, 2 Drawing Sheets

US 8,925,778 B1

ADD-ON STORING AND ORGANIZING COMPARTMENT FOR MOTORCYCLE HARD SADDLEBAGS

CLAIM OF PRIORITY

This application is a non-provisional patent application claiming priority to U.S. Provisional Patent Application No. 61/305,308, filed on Feb. 17, 2010, which is incorporated by reference.

TECHNICAL FIELD

This disclosure relates generally to sub-storage compartments, or sub-compartment for storing and/or organizing articles. It relates more particularly to add-on, sub-storage compartments that are placed in a larger compartment such as hard saddlebags for motorcycles to facilitate storing and/or organizing articles, and method for manufacturing the same.

BACKGROUND

The use of hard saddlebags for storing and/or organizing of articles for motorcycles have been constrained by certain limitations. For example, hard saddlebags are mainly a deep cavity space that do not allow for orderly or secure storage and/or organization of articles or items. Such disorderly and unsecure storage and/or lack of organization of articles presents many problems such as difficulty in quickly finding the desired article, quickly removing and placing of certain articles from the saddlebag, damage to articles as a result of road vibration (e.g., sunglasses, smart cell phones, etc.), desired isolation of certain articles (e.g., electronic devices, smart cell phones, etc.) among others. Use of embodiments to avoid these problems is then desirable.

In the present disclosure, for simplicity and clarity of illustration, the drawing figures illustrate the general manner of construction, and descriptions and details of well-known features and techniques may be omitted to avoid unnecessarily obscuring of the drawings. Additionally, elements in the drawing figures are not necessarily drawn to scale. For example, the dimensions of some of the elements in the figures may be exaggerated relative to other elements to help improve understanding of different embodiments. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the add-on storage and arrangement compartments and methods for manufacturing the same described herein are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the sub-storage compartments and sub-compartments and methods for manufacturing the same described herein are, for example, capable of operation in other orientations than those illustrated or otherwise described herein. The term "coupled," as used herein, is defined as directly or indirectly connected in an electrical, physical, mechanical, optical, or other manner. The term "on," as used herein, is defined as on, at, or otherwise adjacent to or next to or over.

The terms "couple," "coupled," "couples," "coupling," and the like should be broadly understood and refer to connecting two or more elements, mechanically, electrically, optically, and/or otherwise, either directly or indirectly through intervening elements. Coupling may be for any length of time, e.g., permanent or semi-permanent or only for an instant. The absence of the word "removably," "removable," and the like near the word "coupled," and the like does not mean that the coupling, etc. in question is or is not removable.

DETAILED DESCRIPTION OF THE INVENTION

The following detailed description is of the best currently contemplated modes of carrying out exemplary embodiments and manufacturing methods of the invention. The description is not to be taken in a limiting sense, but is made merely for the purpose of illustrating the general principles of the invention, since the scope of the invention is best defined by the appended claims.

Broadly, an embodiment of the present invention generally provides an add-on embodiment in the form of a add-on, sub-storage compartment to be inserted in a larger existing compartment adapted for storing, organizing and/or protecting fragile articles, items, devices and/or accessories and the like ("articles"). The add-on, sub-compartment can be installed as a add-on, sub-storage compartment within an existing saddlebag, the details of which are more fully disclosed herein.

In one embodiment, the add-on, sub-storage compartment comprises a substantially horizontal lower surface, one or more substantially vertical walls coupled to the perimeter of the lower surface, and a cavity defined at least in part by the lower surface and the one or more walls. The add-on, sub-storage compartment also comprises a substantially horizontal upper surface, substantially opposite the lower surface forming a cavity. The upper surface is at least partially open to permit access for orderly and secure storage and/or organization of articles through the upper surface.

Figure 1:
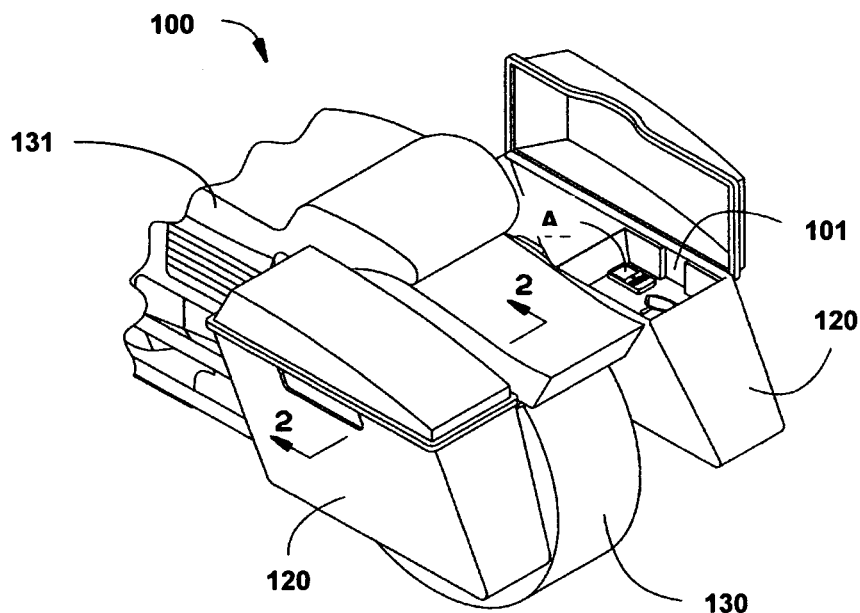
FIG. 1 is a perspective view of the invention according to an exemplary embodiment.
Figure 2:
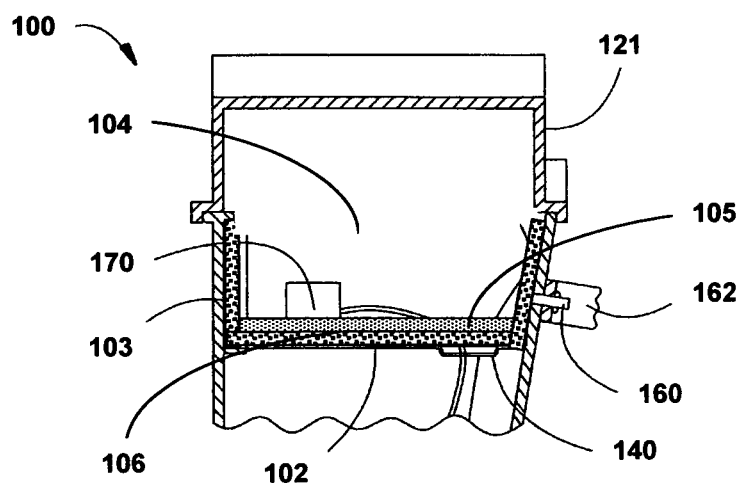
FIG. 2 is a section view of the invention taken along line 2-2 in FIG. 1 according to an exemplary embodiment.

Referring now to FIG. 1, which is a perspective view of the invention according to the exemplary embodiment 100 together with FIG. 2, which is a sectional view of the invention taken along line 2-2 in FIG. 1. The add-on, sub-storage compartment 101 is illustrated in a hard saddlebag 120. Add-on sub-storage compartment 101 comprises a topless cavity or chamber, and comprises a lower surface 102, walls 103 and upper surface 104, the upper surface 104 being substantially open. Add-on, sub-storage compartment 101 also includes at least one appendage and/or tab (not-shown) advantageously adapted extending from the walls 103 away from the upper surface 104 and substantially parallel to horizontal lower surface 102. The tab is adapted to allow add-on, sub-storage compartment 101 to fit snugly and securely into a "hardbag" or "saddlebag" 120. Such hardbags or saddlebags are commonly known in the art. An example of such hard-bag or saddlebag is manufactured and distributed by Harley-Davidson USA of Milwaukee, Wis., USA. Such saddlebags are normally located on the right and left rear sides of a motorcycle (see the position of saddlebags 120 in FIG. 1 relative to the rear wheel 130 of an exemplary motor cycle 131). The add-on, sub-storage compartment 101 advantageously rest in the upper portion of the hardbag 120. It is noted that such hardbags are fastened to the rear sides of motorcycles, and the hardbags normally have a hinged upper door 121, which when closed, exert pressure onto the tabs to hold the add-on, sub-storage compartment 101 securely in place.

Figure 4:
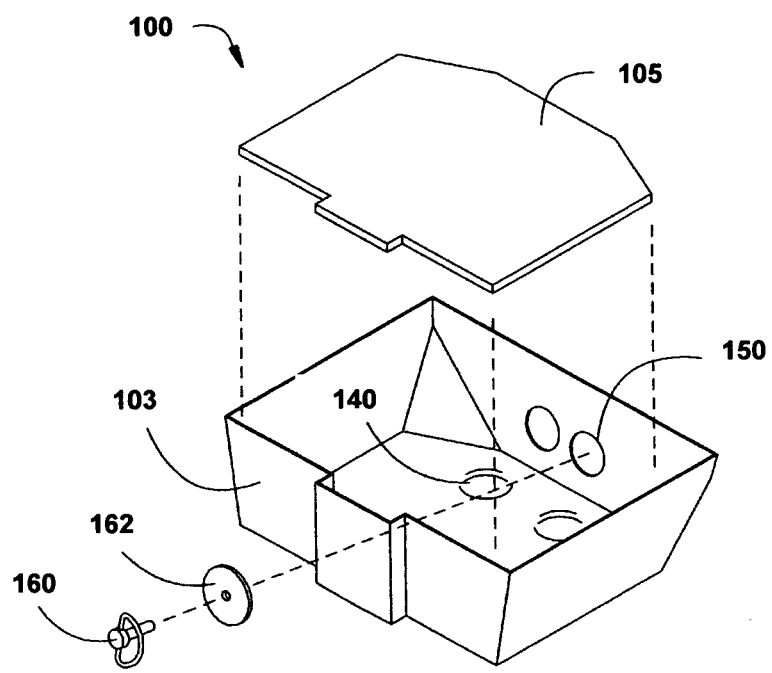
FIG. 4 is an exploded perspective view of the invention according to an exemplary embodiment.

Referring to FIG. 2 is illustrated an anti-static rubber mat 105 that substantially covers the upper surface 106 of the lower surface of add-on sub-storage 100 (see also mat 105 in FIG. 4). The anti-static rubber mat 105 as the name implies is to protect the internals of electronic items or other articles susceptible to static charge or abrasion placed in the add-on sub-storage compartment 101. An example of such items and/or articles susceptible to static charge is a smart cell phone, MP3 players, GPS units and the like (see exemplary item, a smart cell phone A1 in FIG. 1).

Figure 3:
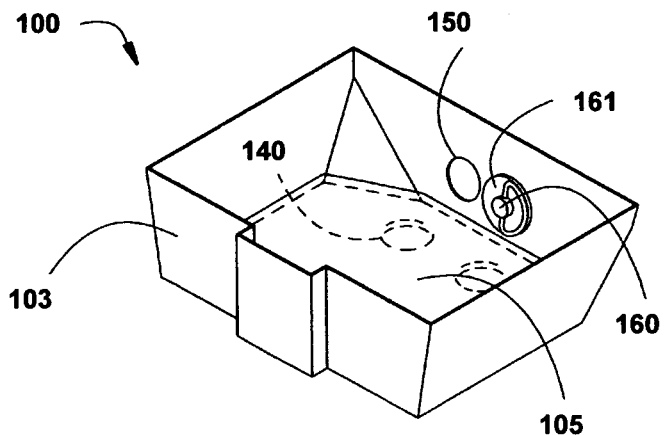
FIG. 3 is a perspective view of the invention according to an exemplary embodiment.

FIG. 3 is a perspective view of add-on, sub-storage compartment 101. The add-on, sub-storage compartment 101 can, for example, may have the following dimensions: about 9.5 inches (approx. 241 mm) long, about 7 inches (approx. 178 mm) wide and about 3 inches (approx. 76 mm) deep. It is noted that suspended add-on, sub-storage compartment 101 with the above dimensions only partially covers the top of the hardbag 120 (see FIG. 1 and FIG. 2); or otherwise, add-on, sub-storage compartment 101 remains suspended and does not touch the bottom of the hardbag 120 as shown in FIG. 1 and FIG. 2. Nevertheless, the add-on, sub-storage compartment 101 can be as deep as to substantially touch the bottom of hardbag 120 if desired.

Referring now to FIG. 2, FIG. 3 and FIG. 4, to facilitate the mating of add-on, sub-storage compartment 101 to an exemplary saddlebag 120, features and hardware that can attach the add-on, sub-storage compartment 101 more securely to the existing saddlebag 120 are illustrated. The add-on, sub-storage compartment 101 in this embodiment further comprises of at least one formed concave recess or guide protrusion 140. The add-on, sub-storage compartment 101, in this embodiment, preferably comprises of two such recesses or protrusions.

In another embodiment for this purpose, the add-on, sub-storage compartment can be securely locked in place with a friction fitment by design in the shape mounting appendages comprising an extended notched section on one side that can be utilized to mate to an existing molded flange and lip in the saddlebag. This mating configuration, comprising an inner flange extension that the compartment notch rests upon and an upper lip that the notch fits underneath, may secure the add-on, sub-storage compartment to the larger hard storage saddlebag without interfering with the closure of the saddlebag lid.

In practice, in one exemplary embodiment for Harley Davidson motorcycles, the add-on, sub-storage compartment 101 may also include two mounting holes 150, each about 11 inches (approx. 28 mm) in diameter, placed on wall 103 of the add-on, sub-storage compartment 101 where they can be used to symmetrically mount the add-on, sub-storage compartments 101 in both the right and left side—it is noted that the add-on, sub-storage compartments 101 are one configured for right hand side and one configured for left hand side—of saddlebags 120 as follows: rear bail head stud pin 160 is removed by making a half turn and pulling out the pin from the rear interior of the hard saddlebag (e.g., this bail head stud pin is what the Harley Davidson company recommends and supplies for attaching the hard saddlebag to the motor cycle). Next, 1 inch (approx. 25 mm) diameter washer 161 is removed from the bail head stud and replaced with a larger (i.e., 1.5 inch (approx. 38 mm)) diameter metal washer 162 as may be supplied in a kit form according to the present invention. The rear (only) tether strap torx screw (not shown) as supplied by Harley Davidson, as a factory supplied component, is next removed and an appropriately sized screw (i.e., $8/32"\times3/4"$ Phillips head screw) supplied as part of the kit (not shown) is inserted into an appropriately sized bushing (i.e., $3/8"\times1/4"$ Nylon) supplied as part of the kit (not shown) and screw/bushing combination is installed into the rear tether strap hole location. The correct side add-on, sub-storage compartment 101 (e.g., right and left side specific) is fitted directly over the rear rubber grommet bail head stud hole 162 and pushed down in place until it snaps over the new Nylon bushing on the exterior side of the hard bag. Finally, the factory supplied bail head stud 160 and oversize washer 161 are installed into the add-on, sub-storage compartment 101 and then into the hard saddlebag wall 103 and back through the rear factory grommet mount hole like it is done for simple removal or installation of factory supplied hard saddlebags. In the practice above, the add-on, sub-storage compartment 101 is more securely fastened in the upper portion of the hard saddlebag 120 for long term use. It is also noted that according to the present invention, the add-on, sub-storage compartment 101 installed in the practice above still allow access to articles and items stored below the add-on, sub-storage compartment 101 in the hard saddlebag 120 without the need to remove the add-on, sub-storage compartment 101.

In another embodiment according to the present invention, the add-on, sub-storage compartment 101 may also comprise, in its lower surface, at least one guide dimple 140, a round concave area about $1/25$ inches (approx. 1 mm) in diameter and 0.125 inches (approx. 3 mm) deep, that may be used for drill guides to install a 12 VDC power supply outlet 170 (see FIG. 3) that can charge electronic devices stored within the add-on, sub-storage compartment 101 as shown in FIG. 1, item A. These guide dimples 140 may be placed in the side of the add-on, sub-storage compartment 101 that is opposite to the side where the ball head fastener mount holes (not shown) are located. The add-on, sub-storage compartment 101 can also comprise a resilient, anti-static rubber mat such as rubber mat 105 (see FIG. 1) about 9 by 6 inches (approx. 229 by 152 mm) in size and 0.25 inches (approx. 6 mm) thick that can be cut, fitted in a shape to cover and be secured in place on the top upper surface 106 of the lower surface 102 of add-on sub-storage compartment 101. The rubber mat 105 can be made of molded rubber, for example (e.g., the method of rubber molding is well known in the art) to provide shock and vibration resistance as well as anti-static properties to protect electronic devices and other fragile items stored within the add-on, sub-storage compartment 101.

In another embodiment according to the present invention, the add-on sub-storage compartment 101 may further comprise a foam insert (not shown). The foam insert can substantially occupy the inside volume of cavity of add-on, sub-storage compartment 101 as defined in FIG. 1 or FIG. 2. The foam insert may have cut outs that may easily be removed, as is well known in the art, to house articles that are fragile or electronic devices that are susceptible to road vibration or shock. Alternatively, the foam insert may be preformed to comprise a number of defined cavities to advantageously contain and protect fragile and susceptible items and/or electronic devices such as smart cell phones, GPS devices, MP3 players, 12 VDC amplifiers, 5 VDC accessories, USB outlets, data storage devices and the like, all of which can be subject to damage from electrical static or road vibration and shock. Similarly, the add-on, sub-storage compartment 101 and foam insert in combination can store and protect other fragile and/or valuable items such as eyewear, keys, wallets and such items that are not designed for the extreme road vibration and shock conditions presented when they are transported on board motorcycles. The foam insert and compartment combination arrangement according to the present invention proves yet more invaluable in off-road motorcycling with road vibration and shock magnitude of order higher than on-road motorcycling.

In another embodiment according to the present invention, the add-on, sub-storage compartment 101 may further comprise of other integrated components. For example, in one add-on, sub-storage embodiment, the add-on, sub-storage compartment 101 may comprise of at least one lighting component (not shown). The lighting component differs than a carry-on flash light in that the lighting component is integrally attached and/or installed onto the add-on, sub-storage compartment 101 to facilitate finding items or articles contained in the add-on sub-storage compartment 101 in dark conditions. Many options are available and are known to one skilled in the art; for example, the integrated lighting component may be similar to the lighting in refrigerators whereby it is electrically activated once the door to the hardbag is open. Alternatively, the light may have a switch for activation. The integrated light component can illuminate the interior of the compartment to assist in finding stored items or articles. It is noted that the lighting component can be constructed in many manners, as is well known in the art, and have components such as LED or incandescent lamps, whereby LEDs are preferred because of their intrinsic values as are well known in the art. Similarly, the power for the lighting component may be provided by disposable batteries or rechargeable batteries (e.g., the recharging power may be supplied by the motorcycle).

In another embodiment according to the present invention, the add-on, sub-storage compartment 101 may further comprise door and lock mechanisms advantageously placed on the upper surface 104 (FIG. 2). Many other similar mechanisms for securely holding and or locking the door to add-on sub-storage compartment 101 such as metal latches, metal or plastic hook, Nylon straps and other similar mechanisms to serve the same or similar functions, as are well known in the art, are within the scope of this invention and are contemplated herein.

Thus far, the embodiments of the present invention have been described in a manner that the add-on sub-storage compartment 101 is configured to have one level or one main upper cavity. In alternative embodiments, the cavity may have two levels and the upper level (not shown) fits completely or partially into the lower level (not shown). It is noted that more than two levels are possible according to the present invention. Further, it is noted that in a two-level embodiment, the upper level and lower level may comprise of all the attributes described and contemplated according to the present invention thus far relating to compartment 101. The upper level may be configured, for example, for storage and organization of one set of items such as electronic devices and such; while, the lower level, for example, is configured for storage and/or organization of another set of items such as jewelry and such. Similarly, in other embodiments according to the present invention, the add-on, sub-storage compartment 101 may comprise of more than one cavity created by partitions (not shown). Again, such divided cavities in add-on, sub-storage compartment 101 may comprise of all the attributes described and completed according to the present invention thus far relating to add-on, sub-storage compartment 101.

It is noted again that add-on, sub-compartments as described herein can be installed in a larger saddlebag 120 in either a suspended manner as described or can be seated on the lower surface of the larger compartment. Such add-on, sub-storage compartments can additionally be designed in size and shape to occupy either a portion or the entire length of the saddlebag or a portion thereof, and furthermore, can be held securely in place by alternative means as described herein.

Methods and Materials of Manufacturing

The embodiments of the present invention can be made using different materials and by different manufacturing methods. For examples, the following materials can be used for the manufacturing of the embodiments according to the present invention: rigid plastics (i.e., glass-field Nylons, polycarbonates, acrylics and methacrylics, acrylonitrile butadiene styrene (ABSs) and rigid polyvinyl chlorides (PVCs) and the like, or semi-rigid plastics (i.e., low density polyethylene, polypropylene, semi-rigid polyvinyl chlorides (PVCs), polyurethanes) and the like, fiberglasses based on acrylics and methacrylics, or metals (i.e., aluminum, stainless steel, brass and the like). Other components such as the flat washers can be made of steel, or alternatively, of aluminum or plastic. Similarly, the insert foam can be made of open-cell or closed-cell polyolefins, polyurethanes and the like. There are no limitations on the materials that can be used in the practice of making the compartments, anti-static mats, foam inserts, partition and or any other components of the present invention.

Similarly, there are no limitations for manufacturing of the add-on, sub-compartments and the components of the present invention. For example, vacuum molding and injection molding methods of rigid and/or semi-rigid plastics can be used. Alternatively, rotational or pultrusion molding can be used if using fiberglass materials. Methods of manufacturing for plastic foams are well known in the art, for example, polyurethane foams can be manufactured by combining polyurethanes and foaming agents and molding the same. Alternatively, if metals are used in practicing the present invention, then methods such as casting, drawing, stamping and other well known methods can be used.

Although the add-on storage and organizer compartments for saddlebags and methods for manufacturing the same have been described with reference to specific embodiments, various changes may be made without departing from the spirit or scope of the disclosure herein. Various examples of such changes have been given in the foregoing description. As another example, although the different add-on storage and organizer compartments for saddlebags described herein have been shown as one cavity, there may be embodiments with multiple cavities. These and other modifications would not interfere with or depart from the concepts described herein.

Accordingly, the disclosure of embodiments of the add-on storage, sub-storage and organizer compartments for saddlebags and methods for manufacturing the same is intended to be illustrative of the scope of the application and is not intended to be limiting. It is intended that the scope of this application shall be limited only to the extent required by the appended claims. For example, it will be readily apparent that the add-on storage, sub-storage and organizer compartments for saddlebags and methods for manufacturing the same discussed herein may be implemented in a variety of embodiments, and that the foregoing discussion of certain of these embodiments does not necessarily represent a complete description of all possible embodiments.

All elements claimed in any particular claim are essential to the add-on storage, sub-storage and organizer compartments for saddlebags claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. An add-on, sub-storage compartment for a motorcycle saddlebag, comprising: a lower surface and a plurality of sidewalls specifically sized to fit snugly and securely into the saddlebag; means attached to at least one of the sidewalls to secure the compartment to the saddlebag; and an appendage extending perpendicularly outward from at least one of the sidewalls, wherein the appendage is adapted to be held in place under the pressure of a closed saddlebag door.

2. The storage compartment of claim 1; whereby
   the saddlebag is a hardbag.

3. The add-on, sub-storage compartment of claim 1;
   having an anti-static rubber mat at the bottom; whereby
   an item stored in the add-on, sub-storage compartment is protected from electrical charges and road vibration while being transported by the motorcycle.

* * * * *